F. B. THOMPSON.
METHOD OF COATING PICTURE FILMS.
APPLICATION FILED JULY 29, 1909.
970,972.
Patented Sept. 20, 1910.
2 SHEETS—SHEET 1.
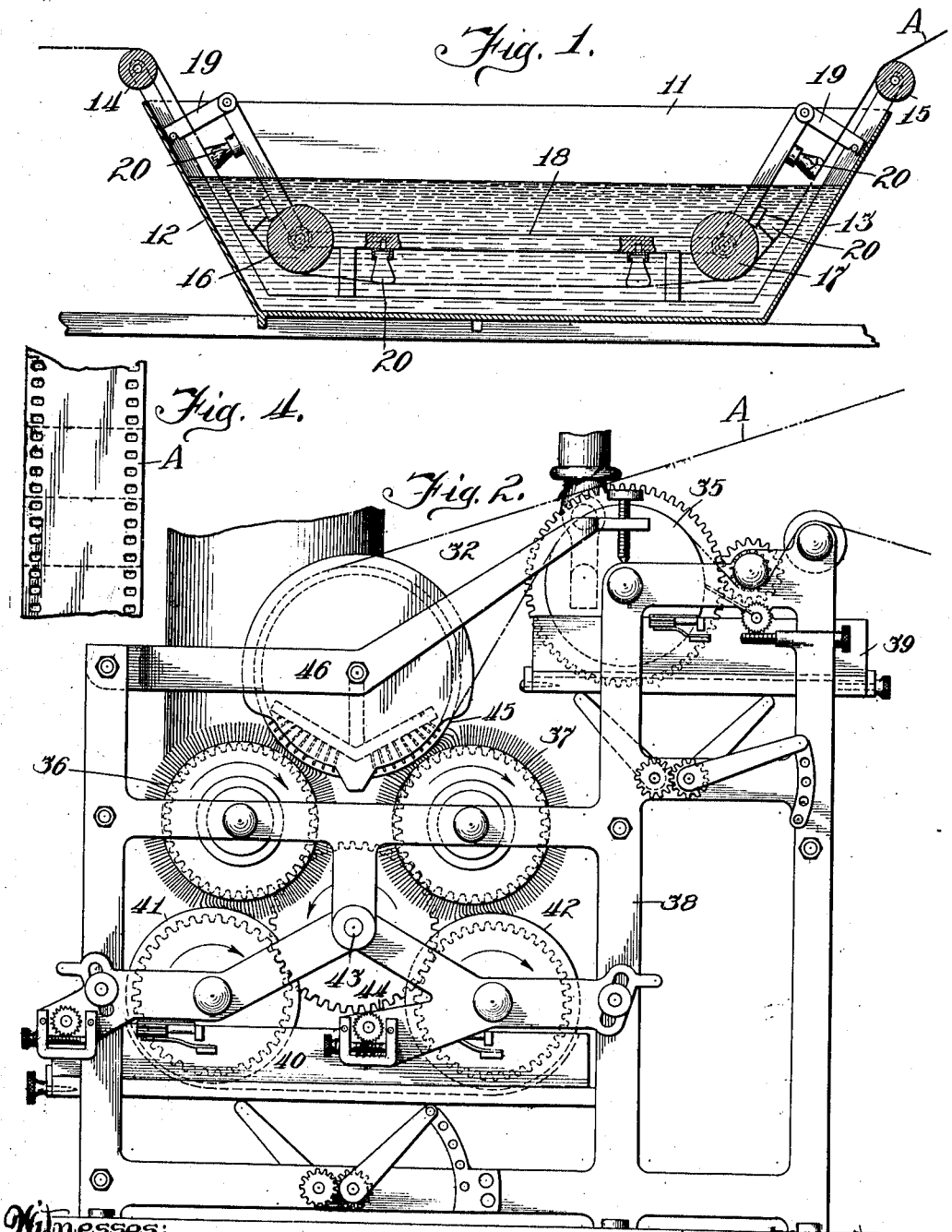
Witnesses:
Milton Lenoir
E. M. Klatcher
Inventor:
Fredrick B. Thompson.
By Gillson & Gillson
Attorneys

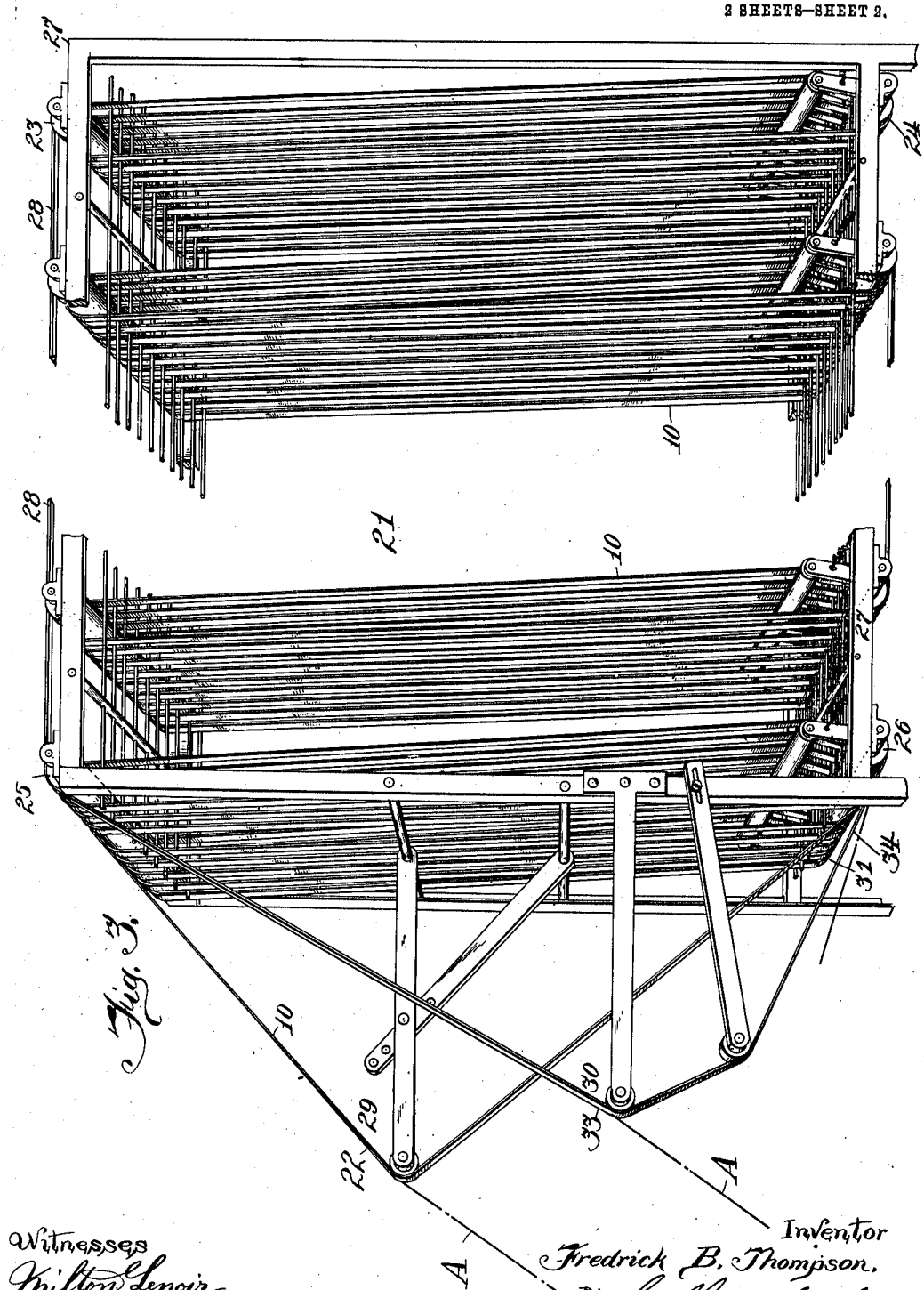

UNITED STATES PATENT OFFICE.

FREDRICK B. THOMPSON, OF CHICAGO, ILLINOIS, ASSIGNOR TO NATIONAL WATERPROOF FILM COMPANY, OF CHICAGO, ILLINOIS, A CORPORATION OF ILLINOIS.

METHOD OF COATING PICTURE-FILMS.

970,972.  Specification of Letters Patent. Patented Sept. 20, 1910.

Application filed July 29, 1909. Serial No. 510,251.

*To all whom it may concern:*

Be it known that I, FREDRICK B. THOMPSON, a citizen of the United States, and resident of Chicago, county of Cook, and State of Illinois, have invented certain new and useful Improvements in Methods of Coating Picture-Films, of which the following is a specification, and which are illustrated in the accompanying drawings, forming a part thereof.

The invention relates to an improved method for applying a protective coating to picture films, particularly those formed in a web for the projection of pictures representing motion and comprising a photographic pellicle of imbibitive material, such as gelatin, carried by a flexible transparent support of celluloid, acetate of cellulose, or similar material.

The invention contemplates the application of a coating to the face of the photographic pellicle which shall, when hardened, resemble in character the flexible transparent support to which the back of the pellicle is adhered. For this purpose a celluloid varnish consisting of a solution of pyroxylin in amylacetate, softened by the addition thereto of small quantities of glycerin or castor oil, is a coating material that may be employed.

The object of the invention is to provide a manner of applying the protective coating which shall insure its becoming efficiently adhered to the face of the photographic pellicle.

Apparatus which may be conveniently employed for practicing the process provided by the invention is illustrated in the accompanying drawings, wherein—

Figures 1, 2 and 3 illustrate, respectively, the several parts of the apparatus, Fig. 1 being a central longitudinal section, Fig. 2 a side elevation, and Fig. 3 a perspective view; and Fig. 4 is a detail face view of a picture film of a form which may be coated by the process.

In carrying out the invention for coating a picture film, the film is first moistened, preferably with water, for the purpose of swelling the absorptive image-carrying pellicle. It is then preferably exposed to the air for a time to permit the evaporation of excess moisture and to allow the swelling or gelatinization of the image-carrying pellicle to become completed. The coating material is then applied to the face of the film in a fluid state, and while the image-carrying pellicle of the film is still softened and swelled with moisture.

When a picture film in the form of a long web is to be treated, the process is preferably practiced progressively upon the film from end to end, the film A (Fig. 4) being moved continuously, as by having its end attached to the moving tape 10 of a film-drying apparatus, such, for example, as that made the subject of my patent on film-drying machine, No. 939,350, dated November 9th, 1909. When moved in this way the film is first cleansed and moistened, as by being drawn through a water tank. One form of water tank which may be used for this purpose is generally designated by the numeral 11, in Fig. 1 of the drawings. The end walls 12, 13, of the tank have marginal guide rollers 14, 15, for supporting the film. Within the tank are other guide rollers 16, 17, carried by a frame 18 removably secured to the tank walls, as by hooks 19. These guide rollers bear upon the face of the film and cause it to travel through the water contained in the tank. Scrubbers, as 20, conveniently made from tufts of fiber or folds of chamois skin, are preferably also carried by the frame 18 to bear upon the surface of the film for the purpose of removing dirt which may be lodged thereon, and for the purpose of more efficiently causing the water to penetrate the imbibitive photographic pellicle. From the water tank 11 the web A is preferably drawn onto the tape 10 of the film-drying apparatus 21, as at 22 (Fig. 3). It is most desirably carried by the tape 10 for a sufficient time to permit the evaporation of excess water which it may have carried out of the tank 11, and to permit the photographic pellicle to become thoroughly softened by the moisture which it has absorbed. The tape 10 of the film-drying apparatus 21 is continuous, and is spirally wound successively about a plurality of pairs of parallel rollers, as 23, 24, and 25, 26, mounted in a frame 27. It returns from the roller 25 to the roller 23 at the top of the apparatus, as shown at 28. Some of the turns of the tape 10 about the rollers 25, 26, are looped out, as shown at 29, 30, for more conveniently receiving and delivering the web A. From the point 22 of the film-drying apparatus the web A travels with the tape 10 several turns about the rollers 25, 26, and is delivered from the drying apparatus at the point 31. The web A is then coated by the application of fluid coating material directly to the moistened photographic pellicle of the web, as by means of the apparatus generally designated 32 (Fig. 2), and is then returned to the tape 10 of the film-drying apparatus at 33. It now travels with the tape 10 across the top of the apparatus at 28 to the last pair 23, 24, of rollers and may, if desired, make the entire circuit of the drying apparatus back to the rollers 25, 26, where it leaves the tape 10 at the point 34.

The coating apparatus illustrated in Fig. 2 is of a form made the subject of the co-pending application of Walter A. Daniels for patent on web-coating machines, filed January 28th, 1909, Serial No. 474,816. It comprises a web-coating roller 35, and roller brushes 36, 37, designed to act successively upon the face of the web A. The roller 35 and the brushes 36, 37, are journaled in a supporting framework generally designated by the numeral 38. The roller 35 is supplied with coating material from a pan 39, into which it dips. The brushes 36, 37, are supplied with coating material from a pan 40, through the medium of rollers 41, 42, which dip into the pan 40 and contact with the brushes, respectively. The roller 35 is turned by the movement of the web A. The brushes 36, 37, and rollers 41, 42, are power-driven preferably through a shaft 43, which has a gear connection 44 with the trunnions of the brushes 36, 37, and rollers 41, 42. The web A contacts with the roller 35 by turning over this roller as a guide. It contacts with the brushes 36, 37, in turning over a guide-roller 45, journaled in arms, as 46, of the frame 38 in front of the brushes. The roller 35 of the coating apparatus 32 applies an initial coating of material to the face of the web A, and the brushes 36, 37, serve for making further applications of the coating material and for spreading that applied by the roller 35. This coating is dried during the subsequent travel of the web through the apparatus 21 (Fig. 3).

Picture films of the form employed for the projection of pictures representing motion are repeatedly flexed and strained in the machines used for their exhibition. This flexing and straining of the web has been found to have a tendency to peel off or blister any protective coating applied to the photographic pellicle of the film. When, however, this photographic pellicle is coated by the method herein described, the coating becomes permanently adhered to it.

I claim as my invention—

1. The method of providing the face of a continuous web having an imbibitive surface with a protective coating which consists in first moistening the said surface of the web, and in then applying to the said surface a film of coating material in a fluid state, such operations being practiced progressively upon the web from end to end.

2. The method of providing the face of a continuous web having an imbibitive surface with a protective coating which consists in first moistening the said surface of the web, and in then applying to the said surface a film of coating material in a fluid state, such operations being practiced progressively upon the web from end to end, and an interval of time being permitted to elapse between the moistening and the coating of any specific portion of the web, whereby the imbibitive surface material of the web may be swelled with moisture when the coating material is applied thereto.

3. The method of forming a protective coating upon the face of a continuous web comprising a gelatin pellicle carried by a flexible non-absorptive support which consists in first swelling the gelatin pellicle with water and in then applying thereto a film of celluloid varnish in a fluid state while the said gelatin pellicle is still swelled with moisture, such operations being practiced progressively upon the web from end to end.

4. The method of forming a protective coating upon the face of a web comprising a gelatin pellicle carried by a non-absorptive support which consists in first swelling the gelatin pellicle with water and in then applying thereto a film of celluloid varnish in a fluid state while the said gelatin pellicle is still swelled with moisture.

5. The method of providing the face of a continuous web having an imbibitive surface with a protective coating which consists in first immersing the web in water, then exposing it to the air for a time to permit adhering water to be absorbed by the imbibitive surface, and in then applying to the said surface while still swelled with water a film of coating material in a fluid state, such operations being practiced progressively upon the web from end to end.

FREDRICK B. THOMPSON.

Witnesses:
E. M. KLATCHER,
LOUIS K. GILLSON.